(No Model.)
L. & A. Y. GRAY.
ATTACHMENT FOR THE SEPARATORS OF THRASHING MACHINES.
No. 448,957. Patented Mar. 24, 1891.
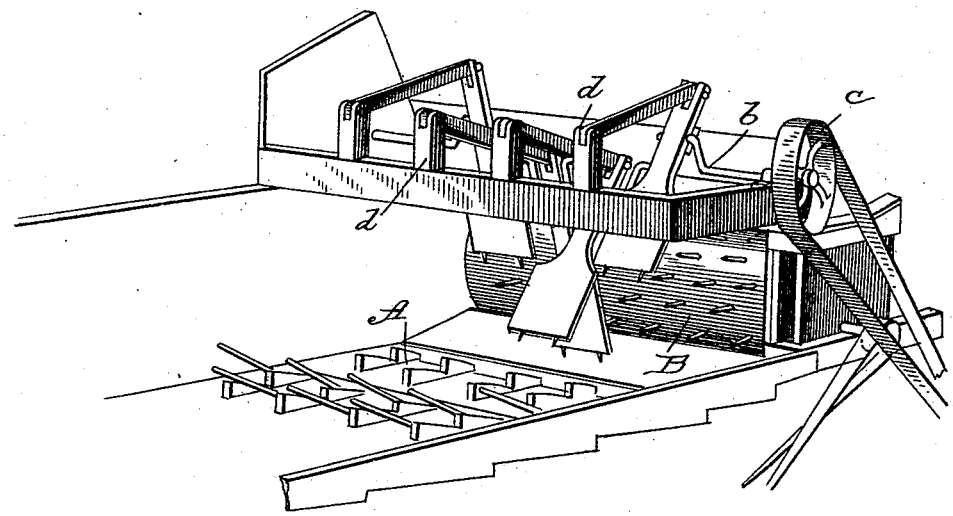

UNITED STATES PATENT OFFICE.

LEONIDAS GRAY AND ALBERT Y. GRAY, OF MIDDLETOWN SPRINGS, VERMONT.

ATTACHMENT FOR THE SEPARATORS OF THRASHING-MACHINES.

SPECIFICATION forming part of Letters Patent No. 448,957, dated March 24, 1891.

Application filed November 6, 1890. Serial No. 370,523. (No model.)

*To all whom it may concern:*

Be it known that we, LEONIDAS GRAY and ALBERT Y. GRAY, citizens of the United States of America, residing at Middletown Springs, in the county of Rutland and State of Vermont, have invented certain new and useful Improvements in Attachments for the Separators of Thrashing-Machines, of which the following is a specification.

Our invention relates to the separator of a thrashing-machine, and is designed to prevent the straw from shooting and clogging the cylinder and to prevent waste of grain. It has been found heretofore in practice that as the straw passes through the cylinder it will shoot or fly from the cylinder when the straw is dry, thus causing the waste of grain, and when the straw is very damp it will clog, as the teeth of the cylinder will catch it and wind it around and around. We have sought to obviate this difficulty and to provide a simple attachment to the ordinary separator, so as to prevent the straw from shooting and the damp straw from clogging the cylinder, while at the same time separating the grain from the straw.

In the accompanying drawing the figure represents the upper part of an ordinary separator of a thrashing-machine containing our attachment.

As the separator is of ordinary construction and operated in the ordinary manner, it need not be described particularly.

The ordinary toothed cylinder is represented at B, and the bed of the separator over which the straw passes from the cylinder is shown at A. In the ordinary operation of the separator the revolution of the cylinder gives a very rapid movement to the straw and grain, causing it to shoot along the bed of the separator when the straw is dry, and thus prevent a perfect action of the separator to secure all the grain, and when the straw is damp the quick action of the cylinder has a tendency to carry the straw around with it, thus causing it to clog. It is desirable, therefore, to prevent this shooting and to retard the movement of the straw as it issues from the cylinder, so that it may receive the full action of the separator, and thus cause a perfect separation. To this end we have provided in rear of the cylinder and above the bed of the separator between the sides thereof a frame *a*, which is adapted to support a series of paddles mounted upon a crank-shaft *b* and driven by a band-wheel *c*. The crank-shaft passes through the paddles centrally of their shanks, the upper ends being bifurcated and connected by means of a link with a stationary projection extending from the frame upwardly, as shown at *d*. The crank-shaft and the connected links give the paddle movement, and this action being contrary or in an opposite direction to the movement of the straw prevents it from shooting along the bed of the separator and imparting to it a slight backward movement, while at the same time it provides a sufficient amount of pressure to aid in the separation. As the paddles work close to the cylinder, they take the straw as it issues, and there is no chance to clog or wind.

We are aware that it is not new to support a series of forks upon a crank-shaft so as to give them a walking movement, and do not claim so, broadly, as to include such an arrangement. We have found, however, that by the use of broad paddles extending laterally of the separator the straw is successfully pushed back and the tendency to shoot entirely overcome, thus stopping the straw and grain near the cylinder, but at the same time taking it away fast enough to prevent clogging.

We claim as our invention—

In combination with the separator of a thrashing-machine, an attachment therefor located above the bed of the separator and in rear of the cylinder, consisting of a series of broad-bladed paddles suitably supported, and means for operating them, substantially as described.

In testimony whereof we affix our signatures in presence of two witnesses.

LEONIDAS GRAY.
ALBERT Y. GRAY.

Witnesses:
A. A. GREENE,
A. C. NORTON.